United States Patent [19]

Wilkins et al.

[11] Patent Number: 4,466,987

[45] Date of Patent: Aug. 21, 1984

[54] PROCESS FOR PREPARING LOW-FAT NUTS

[75] Inventors: Howard Wilkins, Brookfield; Peter M. Gannis, Stamford, both of Conn.

[73] Assignee: Nabisco Brands, Inc., Parsippany, N.J.

[21] Appl. No.: 534,677

[22] Filed: Sep. 22, 1983

[51] Int. Cl.$^3$ ............................................. A23L 1/36
[52] U.S. Cl. ................................. 426/632; 426/417; 426/455; 426/466; 426/804
[58] Field of Search ............... 426/629, 632, 417, 455, 426/466, 506

[56] References Cited

U.S. PATENT DOCUMENTS

| | | | |
|---|---|---|---|
| 2,003,415 | 6/1935 | Ammann | 426/417 X |
| 3,294,549 | 12/1966 | Vix et al. | 426/632 |
| 3,645,752 | 2/1972 | Baxley | 426/632 |
| 4,049,833 | 9/1977 | Gannis et al. | 426/632 X |
| 4,329,375 | 5/1982 | Holloway, Jr. et al. | 426/632 |

*Primary Examiner*—Robert Yoncoskie
*Attorney, Agent, or Firm*—Richard Kornutik

[57] ABSTRACT

Disclosed is an improved process for preparing low-fat nuts, such as peanuts, wherein the nuts are initially moistened, and then roasted at a temperature and for a time effective to develop a roasted flavor and color and to obtain a uniform moisture content of about 3.5 to 8% prior to pressing them to remove a limited amount of the oil. After the initial roasting, the nuts are preferably blanched. The pressed nuts, from which is removed from about 20 to about 60% of the oil, are hydrated to a moisture content sufficient to cause the nuts to regain approximately their normal shape during a final roasting which fully develops the flavor and color of the nuts.

10 Claims, No Drawings

PROCESS FOR PREPARING LOW-FAT NUTS

BACKGROUND OF THE INVENTION

The present invention relates to nuts, and particularly to an improved process for preparing defatted nuts.

The term "nuts" as used in this description includes whole nuts and pieces of nuts such as peanuts, almonds, Brazil nuts, filberts, pecans, walnuts, and the like. For purposes of conciseness in description, the following disclosure will center around the production of low-fat peanuts. It is not intended, however, to be limited to peanuts because the principles which will apply for peanuts should apply to other nuts.

The basic procedures for preparing partially-defatted nuts have been known for a number of years. For example, in U.S. Pat. No. 2,003,415 to Ammann and U.S. Pat. No. 3,294,549 to Vix et al, there are described procedures for pressing the oil from nuts such as peanuts. Broadly, these methods include the steps of pressing nuts until the desired quantity of oil is removed, and then steaming or cooking the partially-defatted nuts in water until the nuts are reconstituted to substantially their original size and shape. Both of these patents discuss the virtues of partially defatted nuts in the diet.

In U.S. Pat. No. 3,294,549, Vix et al indicate that the resulting high protein products have excellent flavor, aroma, taste, texture, and appearance, and good shelf life. They indicate that their process can be performed on raw, toasted, blanched or unblanched nuts with equivalent results; however, no example is directed to toasted nuts and there is no teaching or suggestion that pretoasted nuts, when properly processed, will be more flavorful. One series of Examples discusses hot pressing wherein the nuts are steamed or otherwise moistened and then further heated to a temperature (104° C.) less than required for roasting for flavor development; thus, there was no disclosure that this alternate process improved final product flavor or texture. Moreover, this hot pressing technique resulted in 32.8% of the product being broken to the extent that it passed through a four-mesh screen. This hot pressing technique is similar to that of Ammann who disclosed heating to a temperature of 80° to 90° C. prior to pressing. Further work on the Vix et al process is described in a series of articles entitled "Development and Potential of Partially Defatted Peanuts," *Peanut Journal and Nut World,* January and February 1967, and an article entitled "Low Calorie Peanuts", *Food Processing/Marketing,* September, 1965.

Later workers, encouraged by the apparent appeal of products of that type to weight conscious consumers, continued to work in this area. Because the caloric density of fat is twice that of protein and carbohydrates, the removal of such a significant amount of fat from nut products could result in significant calorie reduction. Moreover, because these products were typically less dense than the normally treated non-defatted nuts, yet further calorie reductions were obtainable. In U.S. Pat. No. 3,645,752 to Baxley, there is disclosed a process which is said to improve the flavor of partially-defatted nuts by quenching them in a flavored oil after roasting. In U.S. Pat. No. 3,740,236, also to Baxley, it is indicated that the roasted peanut flavor appears to be reduced in proportion to the percentage of the peanut oil removed during the pressing process. Baxley, however, does not directly confront this flavor loss but provides a process for improving flavor of the nuts once the flavor is diminished. According to this patent, the defatted nuts are reconstituted in an aqueous binder solution which can also contain flavors.

Gannis et al, in U.S. Pat. No. 4,049,833, also recognized the adverse effect on the flavor and texture of partially-defatted nuts. To correct this, Gannis et al suggested contacting the partially-defatted nuts with a glycerol-containing solution during reconstitution, prior to roasting. They disclosed that after roasting, the treated nuts have improved flavor, texture and storage stability.

The exact reason for the flavor loss in the partially-defatted nuts is not fully understood. The Doctoral Dissertation of M. E. Mason entitled *Procedures in Studying and Factors Influencing the Quality and Flavor of Roasted Peanuts,* Oklahoma State University, 1963, pages 63 and 64, indicates that oil pressed from peanuts contain aleurone grains, among other particulates, which appear to contain flavor precursors. The Mason dissertation, however, was not concerned with the preparation of low-fat nuts, but simply gaining a better knowledge of the source and identification of flavor principals in peanuts.

U.S. Pat. No. 4,329,375 to Holloway and Wilkins discloses a process for preparing low-fat nuts, such as peanuts which retain more of their natural flavor and texture than products prepared by earlier prior art procedures. They disclosed that they had found several factors important to achieving a high quality product. Among these were pre-roasting the nuts to partially develop a roasted nut flavor and color, pressing only after equilibration of the internal nut moisture, and limiting the amount of oil extraction. Products prepared according to the process have achieved commercial success; however, the processing time and equipment necessary to achieve moisture equilibration is more costly than would be desired and, while the process results in the production of more acceptable (whole or half, but unbroken) nuts than the prior art, improved yields are still desired.

SUMMARY OF THE INVENTION

Accordingly, it is an object of the present invention to provide an improved process for preparing partially-defatted nuts.

It is a more specific object of the present invention to provide an improved process for preparing partially-defatted nuts which eliminates processing called for by the prior art while still retaining good flavor and texture.

It is a yet further specific object of the present invention to provide an improved process for preparing partially-defatted nuts which increases the yield of acceptable product.

It is yet another and more specific object of the present invention to provide a process of improved yield and efficiency for preparing partially-defatted peanuts which provide a satisfying combination of peanut flavor, texture, and mouthfeel in a peanut product which also offers a significant reduction in caloric intake.

These and other objects are accomplished according to the present invention which provides an improved process for preparing reduced calorie roasted nuts having good natural roasted flavor and texture. The process comprises roasting nuts at a moisture content and temperature, and for a time, effective to develop a roasted nut flavor and color and to obtain a uniform moisture content within the range of from 3.5 to about 8% based on the weight of the nuts; pressing the nuts under conditions effective to remove from about 20 to 60% of the oil content of the nuts; hydrating nuts to a moisture content sufficient to cause the nuts to regain approximately their normal shape during a final roasting step; and roasting the nuts to fully develop the flavor and color thereof. Preferably, the nuts are cooled after initially roasting, prior to pressing, and the hydration of the nuts after pressing will supply insufficient moisture for immediate return to their original shape, but an amount sufficient to achieve this result only during the final roasting step.

DETAILED DESCRIPTION OF THE INVENTION

The present invention enables the production of partially-defatted nuts of all varieties while retaining a greater degree of their natural flavor and aroma. The nuts can be blanched or unblanched as desired. Similarly, the nuts can be whole or split depending upon the desired end-use.

It has been determined according to the present invention that the natural peanut or other nut flavor and texture can be obtained to the same degree as in the process of Holloway and Wilkins while simplifying that process by the elimination of the separate hydration and equilibration steps following pre-roasting. According to the invention, the pre-roasting step is conducted under conditions of time, nut moisture content and temperature effective to develop the desired roasted nut color and flavor and a moisture content effective for pressing. Also according to the invention, the hydration of the nuts after pressing is preferably restricted to supply only enough water to cause them to return to their original size and shape during final roasting, but not before.

In addition to improving the efficiency in utilizing process equipment and time, the process of the invention produces fewer cracked (unacceptable) nuts and even further improves the yield of whole (unsplit and uncracked) nuts as compared to the process of Holloway and Wilkins. Also, according to the invention, there is evidence that the product, which offers a significant calorie reduction while yet providing good flavor and texture, is less susceptible to oxidation and more stable as to aroma than the product of Holloway and Wilkins.

According to the invention, nuts, such as peanuts, are subjected to an initial roasting operation at a controlled moisture content before or after decorticating or blanching. It is preferred, however, to remove the nut shell, i.e., decorticate, prior to the roasting operation, to save energy and to enable efficient moisture control. Also, where roasting in oil is desired, the outer shell will further cause losses of oil. Blanching, i.e., removing the skin, is preferred in some respects and is less preferred in others. For example, where red skin peanuts are to be air roasted, it is sometimes preferred to leave the skins on until after the initial roasting operation. This has been suggested as a means to improve flavor. However, where the initial roast is to be done by oil roasting, it is usually preferred to blanch prior to roasting.

Initial roasting will be conducted on nuts having a suitable moisture content for a period of time and at a temperature effective to develop a roasted nut flavor and color and to achieve a moisture content of from 3.5 to about 8%. Typically, this will require roasting at an initial nut moisture content of from about 8 to about 12% and a temperature of from about 120° C. to about 175° C. More preferred moistures are within the range of from 10 to 11%. Where the nuts have a suitable moisture content, they can be roasted in this initial stage directly as is, with no need for wetting. This, however, is not typical, because nuts in their raw state are most often available at moistures of around 7–8%, and are wetted by suitable means to bring them to the preferred moisture contents for processing according to the invention. Any suitable means can be employed, such as simple spraying, followed by holding for a time effective to absorb the desired amount of moisture. The amount of water sprayed should be measured to prevent excess hydration because subsequent drying either separately or as part of the initial roast tends to cause flavor loss. A hold time of about 4 to 10 minutes should be sufficient, although any time which is effective can be employed. While not preferred, due to its expected reduction in flavor, the nuts can be moistened with wet steam. Preferably, the nuts will have an initial moisture of about 7 to 8%, are sprayed with sufficient water at 15° to 30° C. to bring the moisture content of the nuts up to about 10 to 11% after holding at 15° to 30° C. for about 5 minutes.

After assuring a suitable moisture content, the nuts are roasted by any effective means under conditions of time and temperature to develop a roasted nut flavor and color and to achieve the desired moisture content for efficient pressing to remove oil without unduly damaging the nuts. For air roasting, the time will typically be in the range of from about 2 to about 60 minutes. Oil roasting times will be shorter. Preferably, this initial roasting operation will be done in air at a temperature of from about 135° C. to about 165° C. for a period of from about 3 to about 15 minutes. The roasting should be as rapid as possible consistent with maintenance of moderate temperature and uniform moisture contents throughout the cross-sections of the individual nuts. Where long roast times are employed, it is necessary to use higher initial moisture contents and excessive flavor is lost by volatilization. Where temperatures are too intense, flavors are also volatilized too rapidly. Presently, air roasting at about 155° C. to about 165° C. for from about 4 to about 8 minutes appears optimum.

In addition to developing the flavor and the color of the nut, this initial roast also partially denatures the protein and reduces the moisture content, typically to a level of from about 3.5 to about 8%. The most preferred results have been achieved where the initial roasting step is permitted to develop the roasted nut flavor and color until the moisture content is decreased to from about 4 to 6%. It is possible to roast to lower moisture contents; however, caution must be exercised so that the roast does not excessively denature the proteinaceous and other materials giving body and structure to the nut or cause such severe moisture loss that rehydration will be required prior to pressing. Also, where excessive roasting results, the nuts become too brittle to survive the pressing operation without excessive breakage. In the case of blanched peanuts, it is possible to establish a colorimetric standard to determine the desired end-point for roasting. According to this procedure, an Agtron color photometer is employed in the green mode using the 12 and 90% plates to define the scale. With this as a standard, reflectance values of from about 25 to about 40, typically about 33, are believed to be about optimum in terms of flavor and overall physical characteristics of the product nuts.

The pre-roasted nuts, having the desired moisture and degree of roast, are then preferably cooled to a temperature suitable for pressing and then pressed according to any technique which is suitable for extracting from about 20 to about 60% of the initial oil content of the nut. The temperature of the nuts during pressing should be maintained to achieve efficient oil removal. Temperatures of from about 20° to about 50° C. are typical of those effective. Cooling can be achieved by any suitable means, such as by forced draft ambient air cooling tunnel.

After cooling, the nuts are pressed by suitable means, for example, by employing a Carver press at applied pressures of greater than about 1000 psig for from about 15 to about 120 minutes. While the exact times and pressures for oil extraction can be varied as desired to obtain the desired degree and rate of extraction, pressures of less than about 1500 psig, preferably about 1200 psig, are preferred. The pressure is preferably brought up to the desired level as quickly as possible. It should be remembered, however, that while pressures much higher than this range will provide more rapid extraction of the oil, they may also cause more physical damage to the peanuts with a possible reduction in the amount of the natural flavors retained therein. Similarly, while pressures lower than this particular range may be employed with somewhat less breakage of the nuts, the time required for extraction of the desired amount of oil will be increased. A desirable balance between calorie reduction and final product flavor and texture can be achieved with oil reductions of between 35 and 55% where processing is accomplished according to the present invention.

The nuts are flattened and undesirably dense after the pressing operation and must be treated, such as by hydration, to return them to approximately their natural shape. It is an advantage of the process of the invention that the nuts are loosely packed and do not adhere into a solid mass. They can be returned to approximately their original size and shape with minimal addition of water. It is desired to obtain bulk densities of less than about 0.50 grams per cubic centimeter for uncoated, oil-roasted nuts, and most desirably within the range of from about 0.40 to 0.45 grams per cubic centimeter. Products prepared according to the invention having these bulk densities offer significant calorie reductions on a volume basis while still retaining a nut-like crunch and chew. These bulk densities are determined by filling a 500 cubic centimeter graduated cylinder with nuts, determining the weight of the nuts, and dividing the weight in grams by the volume in cubic centimeters.

The distorted, partially-defatted nuts are preferably hydrated by contacting them with water, typically at a temperature of about 20° C. Higher water temperatures, in the range of from about 20° C. to 75° C. also may be used. The contacting is conducted for a period of time sufficient to cause the nuts to regain approximately their normal shape. Typically, moisture contents of less than 30%, preferably less than 25%, and most preferably from about 7 to less than 10%, based upon the total weight of the rehydrated nuts, will be effective. Limiting the water content during this stage in processing minimizes the removal of flavors developed during the initial roast. Moreover, it decreases the chance that flavor precursors will be leached by the rehydration medium, and the loss of flavors developed during final roasting by a mechanism thought to be akin to steam distillation where the escaping steam carries off the volatile flavors. The water can be contacted by immersion or spraying, with spraying being preferred. The water can contain any suitable texturizing or flavoring additives as may be desired.

The rehydrated, partially-defatted nuts must be dried and roasted to obtain the final roasted nut product. Roasting and drying can be accomplished in any suitable manner. Typically, the art recognized techniques of dry roasting and oil roasting are effective to achieve the desired degree of flavor and color development while at the same time drying the nuts to a moisture content which is effectively low to provide the desired crunch and chew properties. Typical roasting temperature of from about 120° C. to about 185° C., preferably from about 135° C. to about 175° C. can be employed. Typical oil roasting times will be within the range of from about 2 to about 10 minutes, and more preferably will be within the narrower range of from about 4 to 6 minutes. One preferred set of conditions involves roasting at 165° C. for 4.5 minutes. The final roasting step should be sufficient in intensity and duration to achieve the optimum flavor and color development desired for the particular product end-use. As in the case of the initial roasting operation, the moisture content will most usually be reduced to a level of less than about 3% and preferably is reduced to a level of at least 2% or less, most preferably about 1.5%. Again here, in the case of blanched peanuts, the Agtron color photometer can be employed to standardize the degree of roast. In one typical operation, the device is employed in the green mode with 0 and 75% plates defining the scale on which a reading of from about 35 to about 60 is preferred. Most preferably, the reading will be within the range of from 40 to 45.

When the desired degree of roast is achieved, it is important to reduce the temperature of the nuts rapidly so that they do not become badly over-roasted or burned. This can be accomplished by dumping them rapidly from the roasting apparatus and flushing them with a stream of ambient air. Where the nuts are allowed to drop from the roasting apparatus for a significant fall and are spread uniformly on an open mesh conveyor, it is usually not necessary to overtly blow air onto the hot nuts to achieve cooling.

After the roasting operation, and preferably after cooling, the nuts can be coated with various flavoring agents, allspice, cinnamon, clove, carroway, bay, sage, ginger, basil, and the like, which can be employed alone or with condiments such as salt, pepper, monosodium glutamate, and the like; texturizers such as glycerine; and binders such as natural gums, dextrins, gelatin, sugars, and the like. Where the nuts are dry roasted, a portion or all of the added materials can be introduced prior to completion of the roasting operation.

The following examples are presented for the purpose of further illustrating and explaining the present invention and are not to be taken as limiting in any regard. Unless otherwise indicated, all parts and percentages are by weight, and are based on the total weight of the product at that particular stage in processing.

EXAMPLE 1

This example illustrates the production of partially-defatted roasted peanuts according to the present invention.

Raw redskin Virginia extra large peanuts (7% water) are sprayed with sufficient water to raise their moistures to 11% and held for five minutes under ambient conditions during which the moisture is absorbed. The nuts are then pre-roasted in a forced draft oven at 160° C. for 6 minutes and 15 seconds to develop flavor and color in the nut prior to pressing. The roasted nuts have a moisture content of approximately 5% upon removal from the roaster and cooling to room temperature by forced draft ambient air (20° C.). The nuts are then blanched by means of a whole nut blancher, color sorted, and tested on an Agtron color photometer in the green mode employing the 12 and 90% plates. The peanuts exhibit a reading of about 33. After blanching, the peanuts are placed in a Carver press and pressed at 1500 psig for about 27 minutes. The pressure starts at a value of about 1000 psig and is gradually raised to the final pressure over the period of pressing. Pressing under these conditions removes about 52% of the original oil content of the peanuts. The partially-defatted nuts are then sprayed with water at 20° C. The peanuts at this point in processing contain about 7% moisture. The rehydrated peanuts are then immersed in vegetable oil maintained at 165° C. for about 5.5 minutes to achieve the final roast which indicates a 40 reading on the Agtron color photometer employed in the green mode with the scale defined by the 0 and 75% plates. This product exhibits a bulk density of about 0.44 grams per cubic centimeter and has an acceptable appearance, in terms of the number of cracks, and has good texture and good flavor.

EXAMPLE 2

This example presentes a comparison between the processing of the present invention with processing as done in accordance with Example 3 of U.S. Pat. No. 4,329,375 to Holloway and Wilkins. Samples prepared according to the invention and as set forth in Example 3 of U.S. Pat. No. 4,329,375, were evaluated for the percentage of nuts broken. It will be noted that all samples were pre-roasted, differing only in the sequence and nature of the moistening step. (The first sample was not moistened.) The results are as follows:

| Sample | BREAKAGE % Broken + Fines | % Acceptable |
|---|---|---|
| Pre-roasted/pressed as is | 47.5 | 52.5 |
| Pre-roasted/pressed after moistening but with no equilibration | 27.0 | 73.0 |
| Pre-roasted/pressed after moistening and equilibration | 8.2 | 91.8 |

| Sample | BREAKAGE % Broken + Fines | % Acceptable |
|---|---|---|
| Moistened to 11%/pre-roasted/pressed as is | 2.5 | 97.5 |

EXAMPLE 3

This example compares the aroma stability and resistance to oxidation of the products of the present invention to those prepared by the process of U.S. Pat. No. 4,329,375 to Holloway and Wilkins (H&W). The products of this invention were prepared according to Example 1 above. The products of U.S. Pat. No. 4,329,375 were prepared by initially roasting at 143° C. for 15 minutes to a moisture content of 1.8%, blanching, hydrating to a moisture content of 5%, equilibrating at ambient temperature for 4 hours, surface drying (moisture=4%), and then pressing and finally roasting as set forth in Example 1 above. Accelerated storage was then conducted as set forth in the following tables:

| | SCHAAL OVEN PRESSED PEANUTS (145° F. FORCE DRAFT) Invention vs. H & W | | | | | | | | |
|---|---|---|---|---|---|---|---|---|---|
| | 0 | | 8 Days | | 12 Days | | 18 Days | | 25 Days | |
| | PV | Aroma | PV | Aroma | PV | Aroma | PV | Aroma | PV | Aroma |
| Invention | | | | | | | | | | |
| A | 5 | F | — | F | 18 | F | 37 | F | 77 | S.R. |
| B | 5 | F | — | F | 21 | F | 39 | F | 85 | S.R. |
| C | 5 | F | — | F | 24 | F | 46 | F | 86 | S.R. |
| H & W | | | | | | | | | | |
| A | 8 | F | — | F | 48 | A | 95 | R | 141 | R |
| B | 8 | F | — | F | 43 | A | 70 | S.R. | 88 | S.R. |
| C | 8 | F | — | F | 47 | A | 83 | S.R. | 118 | R |

F = Fresh
A = Acceptable
S.R. = Slight rancid
R = Rancid
*PV = Peroxide Value, Meq/Kg The above description is presented for the purpose of teaching the person of ordinary skill in the art how to make and use the invention. It is not intended to detail all those obvious modifications and variations of the invention which will become apparent to the skilled worker upon reading the description. It is intended, however, that all such obvious modifications and variations be included within the scope of invention which is defined in the following claims.

What is claimed is:

1. A process for preparing reduced calorie roasted nuts while reducing the loss of natural roasted flavor, which comprises: roasting nuts at a moisture content and temperature, and for a time, effective to develop a roasted nut flavor and color and to obtain a uniform roasted moisture content within the range of from 3.5 to 8% based on the weight of the nuts; pressing the nuts under conditions effective to remove from about 20 to about 60% of the oil content of the nuts; hydrating the nuts to a moisture content sufficient to cause the nuts to regain approximately their normal shape during a final roasting step; and roasting the nuts to fully develop the flavor and color thereof.

2. A process according to claim 1 wherein the initial roasting is done by air roasting at a temperature of from about 135° C. to 175° C. for a time of from about 2 to 60 minutes to a moisture content of from about 4 to about 5%, and the nuts are cooled prior to pressing.

3. A process according to claim 1 wherein the moisture content of the nuts prior to roasting is within the range of from about 8 to about 12%.

4. A process according to claim 1 wherein the nuts are peanuts and initial roasting is continued until the color reaches a value of from 25 to 40 as measured by an Agtron color photometer employing the 12 and 90% plates in the green mode.

5. A process according to claim 1 wherein the nuts are peanuts which are blanched prior to pressing.

6. A process according to claim 1 wherein the nuts are pressed at a pressure of greater than about 1000 psig.

7. A process according to either of claim 1 or 6 wherein the nuts are pressed to remove from about 35 to about 55% of the oil.

8. A process according to claim 1 wherein the nuts are peanuts and prior to the initial roasting step have a moisture content within the range of from about 8 to about 12%.

9. A process according to claim 8 wherein the nuts are hydrated to a moisture content within the range of from about 7 to about 10%.

10. A process according to claim 1 wherein the nuts are peanuts and the second roasting is continued until the color reaches a value of from about 35 to 45 as measured by an Agtron color photometer employing the 0 and 75% plates in the green mode.

* * * * *